United States Patent
Pradeep et al.

(10) Patent No.: US 10,339,126 B2
(45) Date of Patent: *Jul. 2, 2019

(54) PROCESSING LOG FILES USING A DATABASE SYSTEM

(71) Applicant: salesforce.com, inc., San Francisco, CA (US)

(72) Inventors: Aakash Pradeep, Union City, CA (US); Adam Torman, Walnut Creek, CA (US); Alex Warshavsky, Walnut Creek, CA (US); Derrill Dabkoski, Oakland, CA (US); Samarpan Jain, Fremont, CA (US); Soumen Bandyopadhyay, Glen Park, CA (US); Thomas William D'Silva, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 685 days.

This patent is subject to a terminal disclaimer.

(21) Appl. No.: 14/717,848

(22) Filed: May 20, 2015

(65) Prior Publication Data

US 2016/0041976 A1 Feb. 11, 2016

Related U.S. Application Data

(63) Continuation-in-part of application No. 14/529,674, filed on Oct. 31, 2014.

(Continued)

(51) Int. Cl.
*G06F 16/00* (2019.01)
*G06F 16/23* (2019.01)
*G06Q 30/02* (2012.01)

(52) U.S. Cl.
CPC .......... *G06F 16/23* (2019.01); *G06F 16/2358* (2019.01); *G06Q 30/0201* (2013.01)

(58) Field of Classification Search
CPC ......... G06F 17/30345; G06F 17/30368; G06F 16/23; G06F 16/2358; G06Q 30/0201
(Continued)

(56) References Cited

U.S. PATENT DOCUMENTS

| 5,577,188 A | 11/1996 | Zhu |
| 5,608,872 A | 3/1997 | Schwartz et al. |

(Continued)

FOREIGN PATENT DOCUMENTS

WO    WO 2011/060306 A2    5/2011

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Monica M Pyo
(74) *Attorney, Agent, or Firm* — Weaver Austin Villeneuve & Sampson LLP

(57) ABSTRACT

Disclosed are some examples of database systems, methods, and computer program products for processing log files. In some implementations, a server of a database system accesses a log file having a release version. The log file includes data entries identifying system events corresponding to user activity. The server generates or updates, based on the release version of the log file, a metadata file indicating approved entry types and approved data. The server also generates or updates, based on the log file and the metadata file, customer-facing log files. Each customer-facing log file is associated with a corresponding customer entity capable of being serviced by the database system. Each customer-facing log file includes a subset of the entries and a subset of the data items of at least one of the entries.

20 Claims, 10 Drawing Sheets

Related U.S. Application Data

(60) Provisional application No. 62/035,722, filed on Aug. 11, 2014.

(58) Field of Classification Search
USPC ................................ 707/755, 661, 672, 781
See application file for complete search history.

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,014,674 A | 1/2000 | McCargar |
| 6,092,083 A | 7/2000 | Brodersen et al. |
| 6,144,967 A | 11/2000 | Nock |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,192,378 B1 | 2/2001 | Abrams et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,873,935 B2 * | 3/2005 | Spinrad ............... G06F 11/3608 702/183 |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 * | 6/2010 | Weissman ........... G06F 21/6218 717/100 |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,478,722 B2 | 7/2013 | Lee et al. |
| 8,484,111 B2 | 7/2013 | Frankland et al. |
| 8,490,025 B2 | 7/2013 | Jakobson et al. |
| 8,504,411 B1 | 8/2013 | Subasic et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,719,462 B1 | 5/2014 | He et al. |
| 8,738,620 B2 | 5/2014 | Lee et al. |
| 8,973,106 B2 | 3/2015 | Warshavsky et al. |
| 9,383,988 B2 * | 7/2016 | Rychikhin ............... G06F 8/65 |
| 9,628,493 B2 | 4/2017 | Warshavsky et al. |
| 9,710,127 B2 | 7/2017 | Torman et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |

(56) References Cited

U.S. PATENT DOCUMENTS

| | | |
|---|---|---|
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0184498 A1 | 8/2006 | Meyer et al. |
| 2008/0201701 A1* | 8/2008 | Hofhansl .................. G06F 8/60 717/168 |
| 2008/0249972 A1 | 10/2008 | Dillon |
| 2008/0288497 A1 | 11/2008 | Watanabe et al. |
| 2009/0063415 A1 | 3/2009 | Chatfield et al. |
| 2009/0100342 A1 | 4/2009 | Jakobson |
| 2009/0119062 A1 | 5/2009 | Owens et al. |
| 2009/0177744 A1 | 7/2009 | Marlow et al. |
| 2010/0070469 A1 | 3/2010 | Bomma et al. |
| 2010/0257351 A1* | 10/2010 | O'Connor ............. H04L 9/0894 713/150 |
| 2011/0113057 A1 | 5/2011 | Lee et al. |
| 2011/0113059 A1 | 5/2011 | Lee et al. |
| 2011/0113072 A1 | 5/2011 | Lee et al. |
| 2011/0161419 A1 | 6/2011 | Chunilal |
| 2011/0218958 A1 | 9/2011 | Warshaysky et al. |
| 2011/0225263 A1* | 9/2011 | Sureshchandra ....... H04L 67/16 709/217 |
| 2011/0231457 A1 | 9/2011 | Tager et al. |
| 2011/0247051 A1* | 10/2011 | Bulumulla .............. G06F 21/00 726/4 |
| 2011/0295728 A1 | 12/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0290547 A1 | 11/2012 | Kamimura et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0006441 A1 | 1/2014 | Torman et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0067171 A1* | 3/2015 | Yum .................... G06F 9/5072 709/226 |
| 2015/0095162 A1 | 4/2015 | Jakobson et al. |
| 2015/0106736 A1 | 4/2015 | Torman et al. |
| 2015/0127670 A1 | 5/2015 | Torman et al. |
| 2015/0142596 A1 | 5/2015 | Jakobson et al. |
| 2015/0172563 A1 | 6/2015 | Jakobson et al. |
| 2016/0041976 A1 | 2/2016 | Pradeep et al. |
| 2016/0359900 A1 | 12/2016 | Crisler et al. |

OTHER PUBLICATIONS

U.S. Office Action dated Jan. 19, 2017 issued in U.S. Appl. No. 14/529,674.

U.S. Final Office Action dated Jul. 25, 2017 issued in U.S. Appl. No. 14/529,674.

U.S. Office Action dated Mar. 8, 2018 issued in U.S. Appl. No. 14/529,674.

U.S. Final Office Action dated Sep. 26, 2018 issued in U.S. Appl. No. 14/529,674.

* cited by examiner

| Logins | | |
| Indexing | | |
| URI | | |

| Type | Server Load | ID |
|---|---|---|
| Cascading Style Sheets | 12% | client1 |
| JavaServer Pages | 2% | client1 |
| JavaScript | 5% | client1 |

*FIGURE 5B*

PROCESSING LOG FILES USING A DATABASE SYSTEM

PRIORITY DATA

This patent document is a continuation-in-part of and claims priority to and commonly assigned U.S. patent application Ser. No. 14/529,674, titled "Methods and Systems for Processing a Log File," by Torman et al., filed on Oct. 31, 2014, which is hereby incorporated by reference in its entirety and for all purposes. This patent document also claims priority to co-pending and commonly assigned U.S. Provisional Patent Application No. 62/035,722, titled "System and Method for Utilizing Metadata Based Executable and Linking Format," by Pradeep et al., filed on Aug. 11, 2014, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document generally relates to log files in a computing environment and, more specifically, to techniques for processing log files using a database system.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive database systems, methods, systems, and computer program products for processing log files. These drawings in no way limit any changes in form and detail that may be made by one skilled in the art without departing from the spirit and scope of the disclosed implementations.

FIG. 5B shows an example of multiple log entries associated with events according to some implementations.

DETAILED DESCRIPTION

Figure 1:
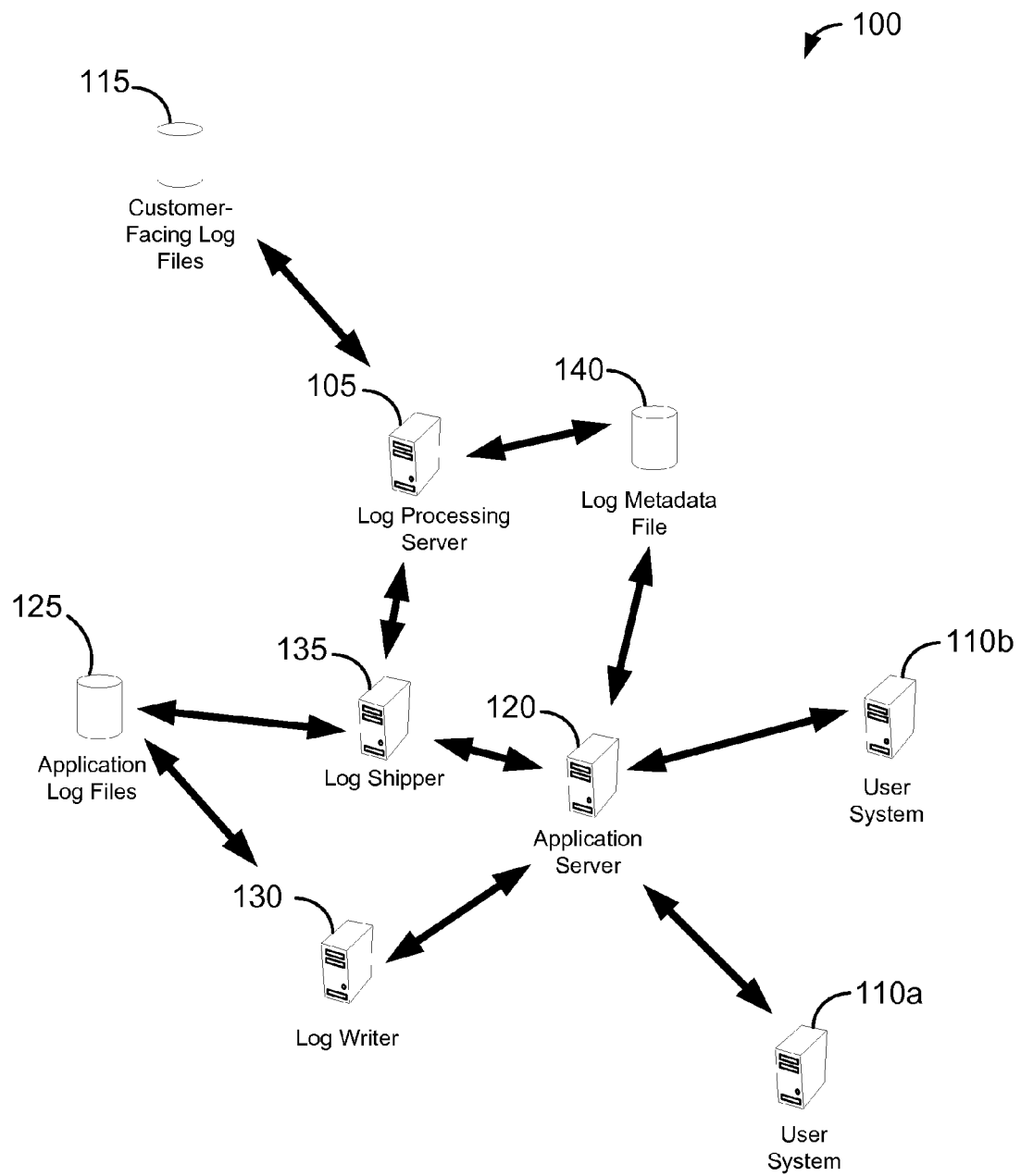
FIG. 1 shows a system diagram of an example of architectural components 100 for processing log files according to some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus, and computer program products for processing log files. In some but not all implementations, a database system is used to maintain one or more log files, and the database system can be in the form of a multi-tenant database system. The multiple tenants of the system may include various organizations of users who interact with cloud-based applications running on the database system or on a platform associated with the database system. In such systems and in other non-multi-tenant and non-database oriented computing systems and environments in which the present techniques can be implemented, the actions of users when interacting with cloud-based applications may cause data to be generated and/or may cause system events to occur, where some or all of such actions, data, and events can be systematically identified in log files maintained in a database or other repository. Non-limiting examples of system events corresponding to user activity include, by way of illustration, a download, a page load, a login or a logout, a URI which may represent a page click and view, an API call, a report, a record access, an export, or a page request. A system event may be generated in response to any type of user interaction. Such log files can be accessed and analyzed as desired to better understand a history of user activity and/or system events. By way of non-limiting example, a multi-tenant database system may be configured to add, to a log file, data entries identifying corresponding user actions as such actions occur so a system administrator can later analyze the log data for debugging and other analytical purposes.

In some instances, a user affiliated with a tenant organization may want to review some of the log data in a log file. For example, it may be desirable to access a log file storing a history of user login events, where each entry in the log file identifies a user's location at the time the user logged into a system, for example, for the purpose of plotting the locations on a map. However, log files maintained in the same multi-tenant database system may include log data for multiple different tenant organizations. The system administrator may not want to allow one tenant organization to have access to data identifying user activity of another tenant organization. Moreover, the system administrator may set up the log file to generate additional proprietary data of one tenant, such as system performance details or other internal metrics, which should not be shared with other tenants. Accordingly, in some of the disclosed implementations, a server may be configured to parse through a log file maintained by a multi-tenant database service and create different customer-facing log files, where each customer-facing log file has data specific to a particular tenant and is not shared with other tenants. Some types of log entries as well as some types of data fields of the log entries can be automatically excluded from a particular customer-facing log file. By the same token, a server generating a customer-facing log file may use a metadata file to identify specific log entry types and data fields to include in the customer-facing log file.

For example, in a multi-tenant database system, log entries can be automatically generated in one or more log files for activities such as user logins to applications running on a system, application programming interface (API) events (e.g., when and how the API is used), file downloads, and user interface actions (e.g., clicking on a button of a user interface provided by an application running on the system). A tenant organization may be interested in the log entries related to logins, downloads, and user interface actions in order to analyze user interactions with the applications of interest to the tenant organization. A system administrator may be interested in those log entries as well as API events. However, the system administrator may not want to provide tenant organizations with the log entries associated with the API events.

In some implementations, a system administrator can specify that only particular types of log entries are provided to the tenant organizations in customer-facing log files. Also or alternatively, only particular fields of the log entries may be provided to the tenant organizations. A database system server can parse through the log files and generate customer-facing log files with log entries specific to a tenant's applications and with the fields of the log entries approved by the developer. Accordingly, a large amount of log file data may be reduced such that each tenant receives a smaller and tailored amount of log file data meaningful to the tenant.

In some instances, the log entries of log files associated with a particular application may change from release to release depending on the preferences of the application developer using the log files for debugging purposes, or on the preferences of the customer receiving the log files for troubleshooting, audit, or analytical purposes. For example, with each release, existing log entry fields may be moved, new fields may be added, or existing fields may be removed. As such, when a server processes a log file to generate the customer-facing log files, it is possible that the schema of the lines changed during the release and, as a result, it is possible that invalid customer-facing log files are created for customers.

For instance, if a new release of an application were to change the position of a field in the log lines, it is possible that all of the resulting fields in a customer-facing log file would be offset by one column. In one example, the "IP Range" field may become the "User Id" field. As a result, when the customer views the customer-facing log file, instead of getting an expected IP Range (e.g. 10.0.0.1), the customer sees an ID (e.g. 00530000004NOSO). Additionally, if a field is removed from a log line, it is possible that the position may be used by another field. For instance, if the "IP Range" field is removed, the corresponding position may then be used by the "User Agent" field, resulting in incorrect information being associated with the column for the customer.

Other issues may arise when a developer wishes to capture particular columns from the log file for the customer-facing log file, but not particular log lines. For example, it may be that any uniform resource identifier (URI) log lines containing a Javascript reference (e.g., *.js) should not be included in the resulting output file; however, the URI column should still be included in the resulting output file. The resulting output file may be a CSV file that can be easily integrated in a company's business intelligence applications to derive insights from the log data. As another example, a developer may not want to capture log lines for file content that was previewed instead of downloaded (e.g., isPreview=true). Additionally, the developer may not want to capture the isPreview column in the resulting customer-facing log files.

A developer may additionally want to include semi-structured schema in a log line to capture composite information, which may change across app versions. In one example, with the ability to capture API log lines, a subset of those transactions can include references to the Salesforce Object Query Language (SOQL) query in addition to a hash of the sessionID. This composite of information can be maintained as metadata in an unstructured attribute called "Extra Field" and later broken out into multiple key-value field pairs.

In some implementations, an event log file system provides a declarative metadata framework for providing instructions to a log processing system to process log files for a particular version of an application. As an example, the log processing system may be a Hadoop system including a file system (HDFS) component for storing the log files and a MapReduce component for processing the log files to generate customer-facing log files. The event log file system may receive a versioned log metadata file that contains instructions for how to process application log files for a particular version of an application in order to generate customer-facing log files having a particular set of log entries and log entry fields that are designated by the versioned log metadata file.

For example, the versioned log metadata file may indicate what types of log entries to include in the customer-facing log file. The versioned log metadata file may also indicate the names and positions of the log entry fields that are to be included in the customer-facing log file. The event log file system then uses this versioned log metadata file to determine how to process the application log files that the event log file system receives.

Some implementations provide an event log file system that is agnostic of any change in the log metadata file from release to release. The event log file system may introduce release versions that can be used to determine the schema and maintain the integrity of the resulting log file. Because the parsing of logs is performed in an automated fashion, during a release cycle, a new version of the log metadata file may be introduced so that correct customer-facing log files are created automatically by the server processing the application log files. The introduction of versioning also enables developers to continue to move, add, or remove fields without having negative consequences on the customer-facing log files provided to the tenant organizations.

In some implementations, the metadata stored in a log metadata file provides an indication of different release versions. The metadata is used for a particular release version to parse the log file produced by the application server of that version. By way of example, this metadata may be used by a MapReduce job to parse the application log file and produce the correct customer-facing log file. In one example, a Hadoop job scheduler may have the responsibility to invoke separate Hadoop jobs for a list of log files for different release versions of the applications. A log shipper may facilitate the process by adding the release version of the application in the application log file name, and the release version may be subsequently used by the Hadoop job scheduler to identify the appropriate log metadata file to use to process the application log file.

In some implementations, the log metadata file may be automatically generated based on log entry definition metadata provided by the developer for each release version of the application. The log entry definition metadata may be provided to the application server in a log entry definition file. The log entry definition file may contain a description of different types of log entries that may appear in the application log files for the respective release version of the application, as well as the particular fields that appear in each type of log entry. The log entry definition file may also indicate which log entry types and fields should be provided to the customer in a customer-facing log file. The log metadata file may be generated based on the log entry definition file and provided to the Hadoop job scheduler to perform the log processing.

FIG. 1 shows a system diagram of an example of architectural components 100 of a database system for processing log files according to some implementations. Architectural components 100 may provide communications to be transmitted among a variety of different hardware and/or software components. In FIG. 1, architectural components 100 include log processing server 105, user system 110a, user system 110b, customer-facing log files 115, application server 120, application log files 125, log writer 130, log shipper 135, and versioned log metadata file 140. In other implementations, the functionality in the architectural components may be implemented in more or less servers.

User systems 110a and 110b may be any type of computing device. For example, user systems 110a and 110b may be portable electronic devices such as smartphones, tablets, laptops, wearable devices (e.g., smart watches), etc. User systems 110a and 110b may be another server or a desktop computer. Additionally, user systems 110a and 110b may be different types of computing devices. For example, user system 110a may be a desktop computer whereas user system 110b may be a smartphone. In some implementations, user systems 110a and/or 110b may be an integration service.

In some implementations, application server 120 may include applications used by different tenants of application server 120. As each client of each tenant interacts with the applications, log entries corresponding to the interactions may be generated by log writer 130 and saved in application log files 125, which may be a content management system, document repository, database or other storage mechanism for log files. At certain times, log shipper 135 may send one or more log files 125 to the log processing server 105. In some implementations, log files 125, log writer 130, and log shipper 135 may be integrated within application server 120.

For example, if a tenant's client logs into an application, a corresponding log entry may be stored in a log file in log files 125. The log entry may include a variety of data such as a tenant ID (i.e., a unique identifier associated with the tenant), event type (i.e., a login), location (i.e., the geographic location from which the client logged into the application), timestamp (i.e., when the login occurred), and internal system information (e.g., a server load associated with the login). If another client of another tenant logs into the application, another log entry may be stored in the same log file.

As another example, if a client downloads a file, another log entry may be generated in the same log file or in another log file in log files 125. The new log entry may include data such as the tenant ID, event type (i.e., a download), timestamp (i.e., when the event, or download, occurred), the file name of the downloaded file, and internal system information (e.g., the bandwidth used by the system to provide the download).

At a particular time, for example at 2 A.M. or during other periods of low activity, log shipper 135 may obtain the log files 125 and provide the log files to log processing server 105. The log processing server 105 may also receive a versioned log metadata file 140 from the application server. The versioned log metadata file 140 may provide information to the log processing server 105 about the structure of the log files 125 received from the log shipper 135.

Log processing server 105 may receive the log files from log shipper 135 and, using the versioned log metadata file, parse through the log files and generate customer-facing log files 115 for each of the tenants to be stored in an appropriate database. In some implementations, log processing server 105 may directly store the customer-facing log files 115. In other implementations, application server 120 may receive the customer-facing log files 115 from log processing server 105 and then store them in a database. That is, customer-facing log files 115 may include log files specific for each tenant based on the log files provided by application server 120 and the versioned log metadata file. Accordingly, co-mingled data associated with multiple tenants may be split into separate log files.

For example, log files 125 may each include log entries associated with different events. Additionally, each log entry may include a variety of fields associated with the event. As an example, as previously discussed, a download event type log entry may include fields providing data such as the tenant ID, event type, timestamp, file name, and bandwidth information. The versioned log metadata file 140 may indicate which types of log entries (e.g., log entries associated with download events) may be used to generate the customer-facing log files 115. The versioned log metadata file 140 may also indicate which types of fields of the log entries (e.g., event type, timestamp, and file name) may be used to generate the customer-facing log files. That is, the versioned log metadata file 140 may indicate data fields that can be represented in the customer-facing log files and/or the fields that may be purposefully kept away from the tenants.

Additionally, the versioned log metadata file 140 may indicate the formatting of the log entries of the log files. For example, in addition to identifying the names of the fields of the log entries to include in the generated customer-facing log files, the versioned log metadata file 140 may also include position numbers for each identified field, each position number indicating the location of the identified field within the log entry. The versioned log metadata file 140 may serve as instructions for the log processing server 105 to select the appropriate log entries and log fields to be included in the customer-facing log files. In the event that a new version of the application is deployed, the log files generated by the new version of the application may contain log files having log entries that are formatted differently from log entries from a previous version of the application. As such, a different versioned log metadata file may be provided to the log processing server 105 for each version of the log files. The version identified for a log file may correspond to the version of the application generating the log entries of the log file.

For example, version 1 log files for an application may contain log entries generated by version 1 for an application, and the application server 120 may also provide a log metadata file corresponding to version 1 of the application to the log processing server 105. The log processing server may utilize the log metadata file corresponding to version 1 of the application to identify which log entries and which log fields to include in the customer-facing log files. The log processing server may subsequently receive some version 2 log files for a second version of the application. The log processing server may also receive a different log metadata file corresponding to version 2 of the application from the application server 120. The log processing server may utilize the different log metadata file to process the version 2 log files received from the application server.

As such, log processing server 105 receives log files from application server 120 and, using the versioned log metadata file 140, parses through and pares down the data in log files to generate smaller, customer-facing log files. Log processing server 105 or application server 120 may store the customer-facing log files in customer-facing log files 115, which may be a database or other type of storage. User system 110*a* and user system 110*b* may be able to access their respective log files by application server 120. For example, user system 110*a* may be able to access its own customer-facing log file providing details based on the actions of its clients from log processing server 105. Likewise, user system 110*b* may be able to access its own customer-facing log file providing details of its clients from log processing server 105. As such, a subset of the data from log files of a multi-tenant database system may be provided to the corresponding individual tenants.

Figure 2:
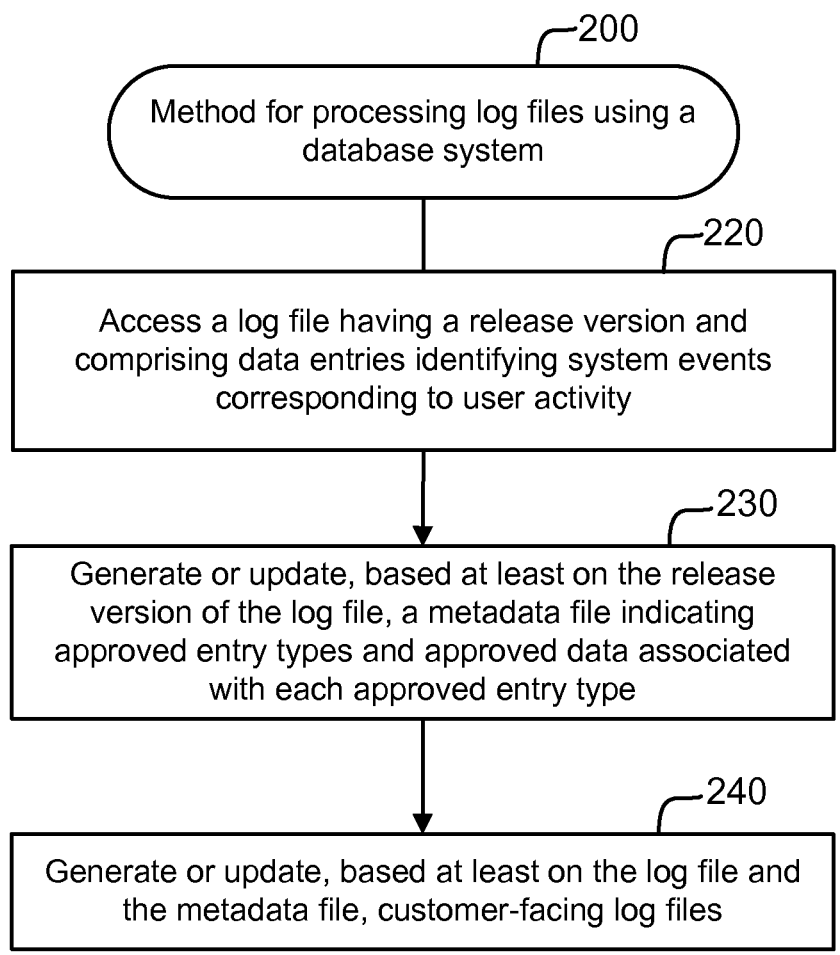
FIG. 2 shows a flowchart of an example of a method 200 for processing log files, according to some implementations.

FIG. 2 shows a flowchart of an example of a method 200 for processing log files, according to some implementations. Method 200 is described with reference to the architectural components of FIG. 1 for illustrative purposes, but method 200 is not limited to such an implementation.

In FIG. 2, at block 220, a server of a database system accesses a log file including data entries identifying system events corresponding to user activity. The log file may be stored as one or more data objects in a database and associated with a release version. By way of example, the user activity and corresponding system events may be associated with an on-demand application hosted by a database system. In some implementations, the release version associated with the log file corresponds to a version of the application hosted when the system events identified in the log file occurred. Each data entry of the log file includes one or more data items.

For example, at a time when the database system is relatively idle, log files may be transferred from application server 120 of FIG. 1 to log processing server 105 to process the log files. As an example, in FIG. 6, log shipper 135 may retrieve log files 125 from application server 120 and "ship" the logs to log processing server 105. In some implementations, log shipper 135 may be a separate server, part of application server 120, log processing server 105, etc. In some implementations, the log files may be stored by the log processing server 105 and then analyzed and/or parsed as disclosed herein. However, in other implementations, the log files may be analyzed and parsed on-the-fly as the log files are received by log processing server 105 from log shipper 135.

Figure 5A:
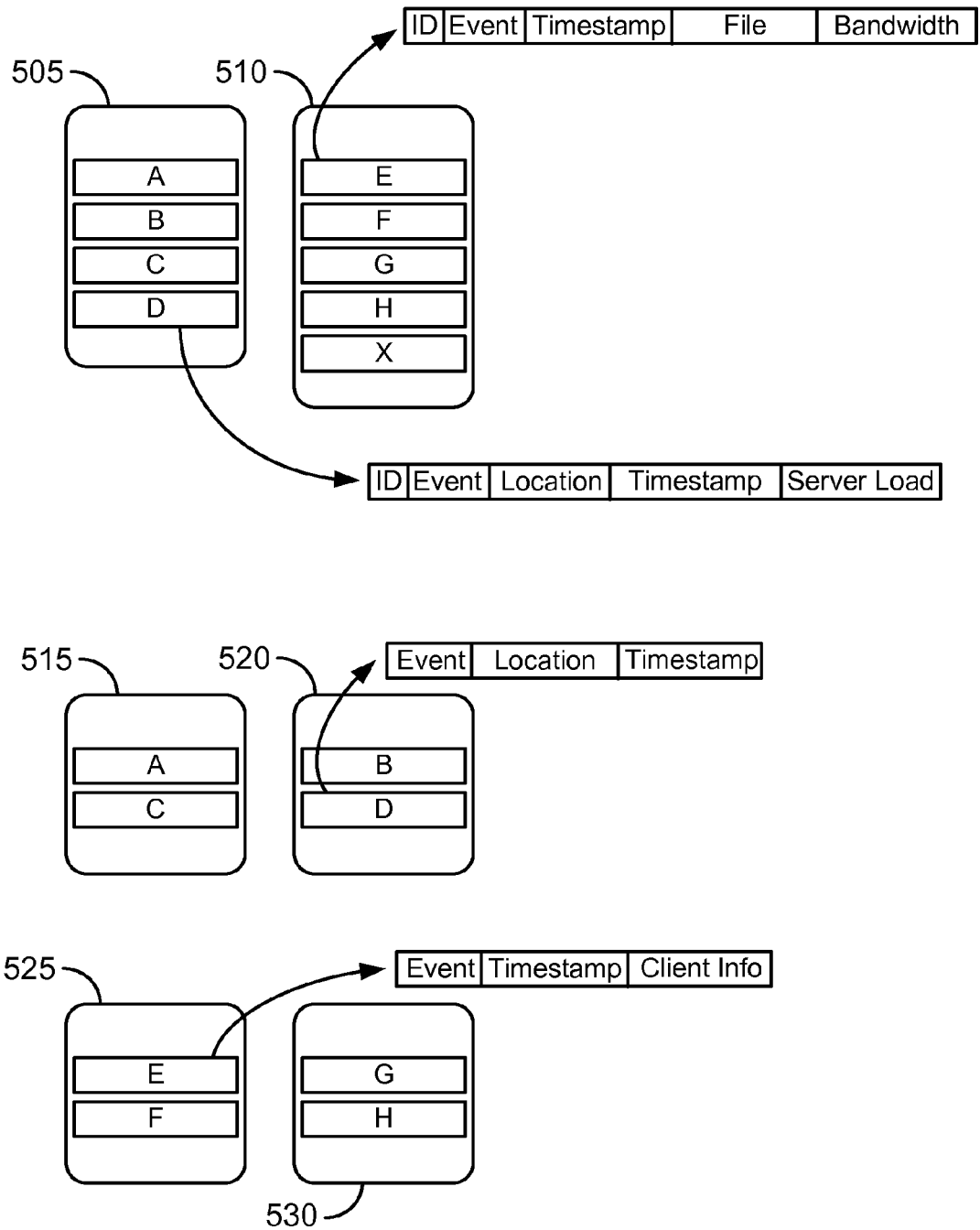
FIG. 5A shows an example of processing log files using a database system according to some implementations.

For example, in FIG. 5A, log file 505 may include 4 log entries: log entry A, log entry B, log entry C, and log entry D. Each of the four log entries in log file 505 may be generated when a client of a tenant of a multi-tenant database system logs into an application hosted by the multi-tenant system. As an example, log entries A and C may be created when the clients of a tenant log into an application. In particular, the system may capture or determine that the event occurred and then generate the log entry. Log entries B and D may be created in the same log file 505 when different clients of a different tenant log into an application. Accordingly, a single log file may include log entries from the clients of multiple different tenants of the multi-tenant system.

In this example, each log entry generated upon a client logging in includes five data fields: tenant ID, event, location, timestamp, and server load, as depicted for log entry D in FIG. 5A. Tenant ID may be an identifier (e.g., a unique number) associated with the tenant. Different clients of different tenants may generate different corresponding tenant IDs in the respective log entries. For example, log entry A and log entry C may both have the same tenant ID because the client actions are associated with the same tenant. Likewise, log entry B and log entry D may both have another tenant ID because the client actions are associated with another tenant. The event data field may indicate the event type or user action that resulted in the generation of the log entry, for example "login" in the example of FIG. 5A. The location data field of the log entries in log file 505 may indicate a geographic location (e.g., country, state, city, etc.) from which the clients are logging in. The timestamp data field may indicate when the client action was performed. The server load data field may indicate the server load at the time when the client action was performed.

Log file 510 includes five log entries: log entry E, log entry F, log entry G, log entry H, and log entry X. Each of the five log entries in log file 510 may also be generated upon a client action by the multi-tenant system, similar to log file 505. However, rather than each log entry in log file 510 being generated upon a client logging into an application, log entries E-H in log file 510 may be generated upon a client downloading a file, and log entry X may be generated upon a client using an API. Accordingly, log file 510 includes co-mingled data from multiple tenants as well as co-mingled log entries of different types (e.g., download and API event types). Each of the log entries E-H in log file 510 includes five data fields: tenant ID, event, timestamp, file, and bandwidth. Tenant ID may indicate the particular tenant associated with the client performing the action that result in the generated log entries. "Event" may indicate a type of action that led to the generation of the log entry, for example, "download." Similar to log file 505, timestamp may be the time when the action was performed. The file data field may indicate the name of the file that was downloaded by the client. Lastly, the bandwidth data field may indicate the bandwidth used by the system to allow for the client to download the file. By contrast, log entry X may include different data fields than log entries E-H because log entry X is for a different event type (i.e., an API use in this example).

In some implementations, the log entries of log file 510 are generated by user interactions with a particular version of an on-demand application hosted by the database system. In some implementations, each log file shipped by the log shipper to the log processing server may include log entries that pertain to a particular version of the on-demand application hosted by the database system. In another implementation, the log shipper may ship a log file containing log entries for different versions of the on-demand application, and the log processing server may be configured to differentiate log entries for one version of the application from log entries for another version.

Returning to FIG. 2, at block 230, a server of the database system generates or updates, based at least on the release version of the log file, a metadata file. The metadata file includes information indicating one or more approved entry types and approved data associated with each approved entry type. In some implementations, the metadata file is an extensible markup language (XML) file. The metadata file may correspond to a particular version of log files generated from user interactions with an application.

As an example, a portion of a metadata file may be as follows:

```
<?xml version="1.0" encoding="UTF-8" standalone="yes"?>
<event-log-file>
    <version>190.0</version>
    <event>
        <name>APEX_CALLOUT_EVENT</name>
        <code>apout</code>
        <fieldlist>
            <field>
                <name>TYPE</name>
                <position>1</position>
                <isInternal>false</isInternal>
                <isExtraField>false</isExtraField>
            </field>
            <field>
                <name>SUCCESS</name>
                <position>2</position>
                <isInternal>false</isInternal>
                <isExtraField>false</isExtraField>
            </field>
            <field>
                <name>URL</name>
                <position>5</position>
```

```
                <isInternal>false</isInternal>
                <isExtraField>false</isExtraField>
            </field>
        </fieldlist>
    </event>
...
```

In this example, the metadata file may correspond to version 190.0 of the log files and indicate the event types and fields from the log files that are to be included in the customer-facing log files. In this example, the <event> section of the XML file describes one approved event type, APEX_CALLOUT_EVENT, that may be included in the customer-facing log files. The <name> field indicates the name of the event type, APEX_CALLOUT_EVENT. The <fieldlist> section includes a list of field data for fields from the APEX_CALLOUT_EVENT log entries to include in the customer-facing log files. In this example, the metadata file indicates that the TYPE, SUCCESS, and URL fields for each APEX_CALLOUT_EVENT log entry should be included in the customer-facing log file. The metadata also indicates the position within the incoming log files for each of the TYPE, SUCCESS, and URL fields. As such, the log processing server may use this metadata file to identify all of the log entries from the incoming log files, filtered according to the event types for the log entries, to include the customer-facing log files. The log processing server may also use the <fieldlist> section of the incoming log files to determine exactly which fields of the log entries to provide in the customer-facing log files, and the order in which the fields should be provided.

In some implementations, the metadata file is generated by an application server based on a log entry definition file comprising descriptive data describing each entry of the log file and comprising approval data identifying approved entry types and approved data. In some implementations, the log entry definition file may be an XML file provided by a developer or administrator of the on-demand application provided by the database system. The formatting of resulting log files may change each time a new version of the application is released. As such, a new log entry definition file is provided with each new version of the application, and the metadata file may be automatically generated based on the new log entry definition file and provided to the log processing server as instructions for generating the customer-facing log files.

As an example, a portion of a log entry definition file that may be used to generate the metadata file exemplified above may be the following:

```
<log-record component="ap" subtype="out" class="Callout"
event_log_type="APEX_CALLOUT_EVENT">
    <field type="String" name="type" event_log_field="TYPE"
    desc="callout type"/>
    <field type="Boolean" name="success"
    event_log_field="SUCCESS" desc="whether call was successful"/>
    <field type="Number" name="statusCode" desc="HTTP status
code"/>
    <field type="Number" name="responseSize" desc="size of
    response"/>
    <field type="EscapedString" name="url" event_log_field="URL"
    has_password="true" desc="url"/>
</log-record>
```

In this example, the log entry definition file provides information for all of the fields that appear in an APEX_CALLOUT_EVENT log entry, as well as the order in which those fields appear. The five fields in this log entry are, in the following order, "type," "success," "statusCode,"

"responseSize," and "url." The log entry definition file also indicates which of these fields should be included in the customer-facing log file by providing the attribute "event_log_field" in the <field> tags for the desired fields. The fields that include an "event_log_field" attribute will appear in the metadata file in a <field> section, and the <field> section of the metadata file will have the value of the "event_log_field" attribute as the <name>. For example, the log entry definition file above indicates that the first ("type"), second ("success"), and fifth ("url") fields of the log entry should be provided in the metadata file with the names, "TYPE," "SUCCESS," and "URL," respectively. Moreover, the <position> value in the resulting metadata file is based on the position of the <field> tag in the <log-record> definition of the log entry definition file. As such, the positions for the fields indicated in the metadata file above are 1, 2, and 5, respectively.

When a new version of the application is deployed on the database system, the log entries may change. The ordering and the names of the fields may have changed. The approved entry types and fields to be provided to the customer-facing log files may have changed as well. As such, a new log entry definition file may be provided with the new version of the application, including the names and positions of each of the fields of the log entries, as well as indicating the entry types and fields to provide in the customer-facing log files.

In some implementations, in FIG. 1, the log processing server 105 receives the log file from the log shipper 135 and the log metadata file generated by the application server as described above. In some implementations, the log processing server 105 may receive the log entry definition file and generate the metadata file based on the log entry definition file. In other words, generation of the metadata file from the log entry definition file may be performed by either the application server 120 or the log processing server 105.

Returning to FIG. 2, at block 240, a server of the database system generates or updates, based at least on the log file and the metadata file, one or more customer-facing log files. The customer-facing log files may be stored in a content file system, and one or more pointers to the customer-facing log files may be stored as one or more data objects in a database of the database system. Each customer-facing log file may be associated with a corresponding customer entity capable of being serviced by the database system, and each customer-facing log file may include a subset of the entries and a subset of the data items of at least one of the entries. In some implementations, each customer-facing log file is associated with a version of the application hosted by the database system.

In some implementations, the customer entity may be a tenant of the multi-tenant database system hosting the on-demand application that users of the tenant are interacting with. The tenant may be provided with a customer-facing log file that contains a relevant subset of the log entries and log entry data, which is indicated by the approved entry types and approved data provided in the metadata file. As described above, the metadata file provides instructions to the log processing server for determining which log entries to select from the log file, and which fields to select from each log entry.

Figure 3:
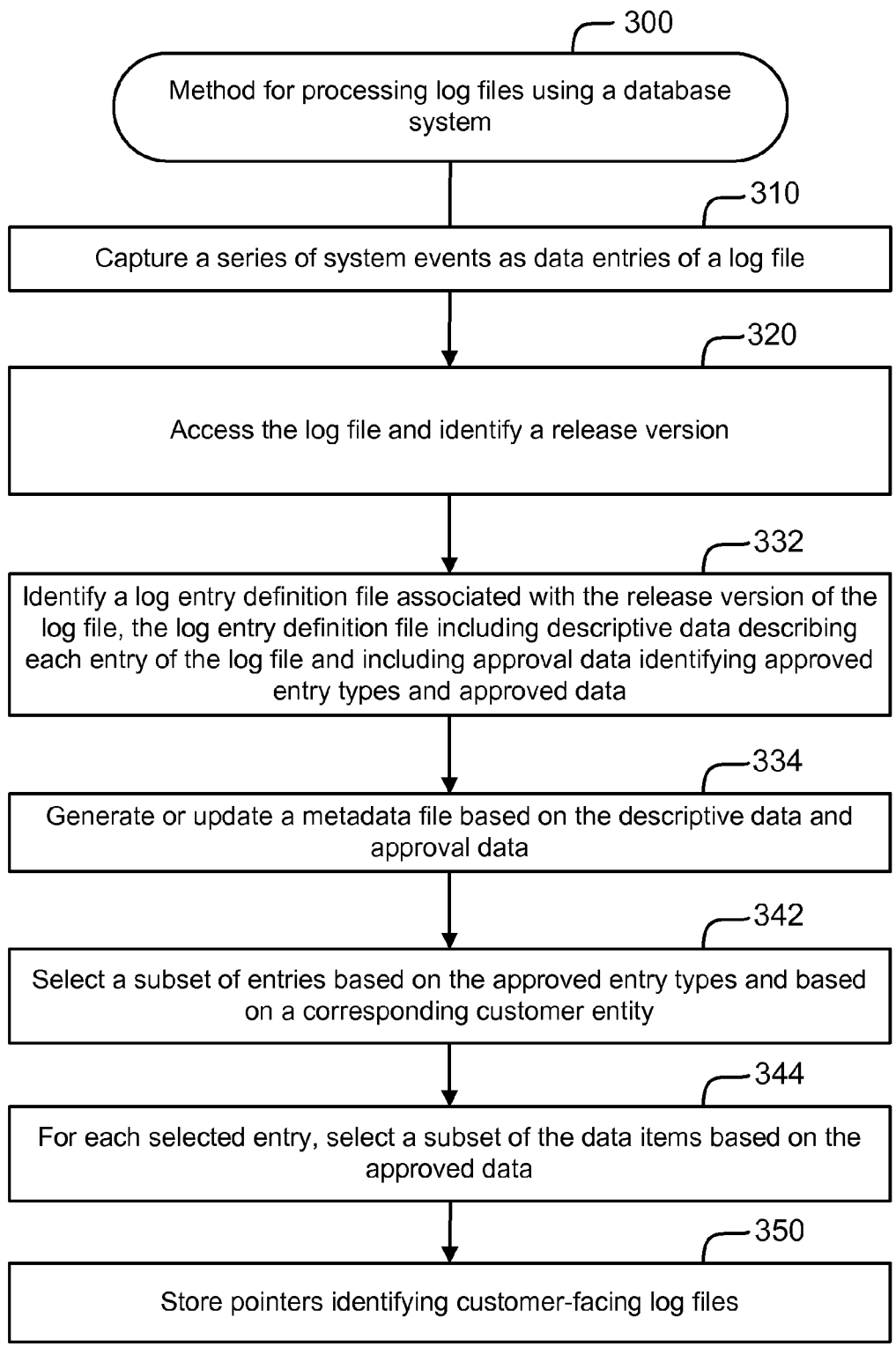
FIG. 3 shows a flowchart of an example of a method 300 for processing log files, according to some implementations.

FIG. 3 shows a flowchart of an example of a method 300 for processing log files, according to some implementations. In FIG. 3, at block 310, a server of a database system captures a series of system events as the entries of a log file. The various types of system events that may be captured in the log file are described above with reference to block 220 of FIG. 2. In some implementations, the database is a multi-tenant system, in which the clients (or users) of the tenants using the applications hosted by the multi-tenant system are performing actions that may result in a log entry being generated in a log file hosted by the system. Each log entry may appear as a line in the log file.

In FIG. 3, at block 320, the server of the database system access a log file storing data entries identifying system events corresponding to user activity, as generally described above. At block 332, the server of the database system identifies a log entry definition file associated with the release version of the log file. The log entry definition file may be stored as a data object in a database of the database system. The log entry definition file includes descriptive data describing each entry of the log file and includes approval data identifying approved entry types and approved data. As discussed above at block 230 of FIG. 2, in some implementations, the descriptive data may provide a description of log entry types that may appear in the log files for a particular application. The description of a log entry type may include a list of fields that appear in order in a log entry having the log entry type. The release version of the log file corresponds to the release version of the application that generated the log file. In some implementations, a new log entry definition file may be provided along with a new release version of an application.

In FIG. 3, at block 334, the server of the database system generates or updates the metadata file based on the descriptive data and approval data of the log entry definition file, as generally described above at block 230 of FIG. 2. In FIG. 3, at block 342, the server of the database system selects a subset of the log file entries based on the approved entry types and based on a corresponding customer entity. Returning to FIG. 6, in some implementations, log processing server 105 may include map reduce logic 610 for selecting the subset of the log file entries. In particular, map reduce logic 610 may analyze the received log files 125 and determine which log entries should be provided to particular clients.

As an example, over 200 types of log entries generated upon different events may be in a log file. However, the system administrator may only want the tenants to receive log lines that correspond to 28 approved entry types. For example, log entries corresponding to logins and downloads (e.g., log entries A-D in log 505 and E-H in log 510 in FIG. 5A) may be approved, but log entries corresponding to API events (e.g., log entry X in log 510) may not be approved because the associated log entries are mainly for internal purposes that should not be provided to the tenants. Accordingly, the system administrator may designate approved log entries, for example, in an XML data file with designations or attributions of the approved types of entries. The XML data file may be provided to map reduce logic 610 as a system selection indicating the approved log entries.

Figure 6:
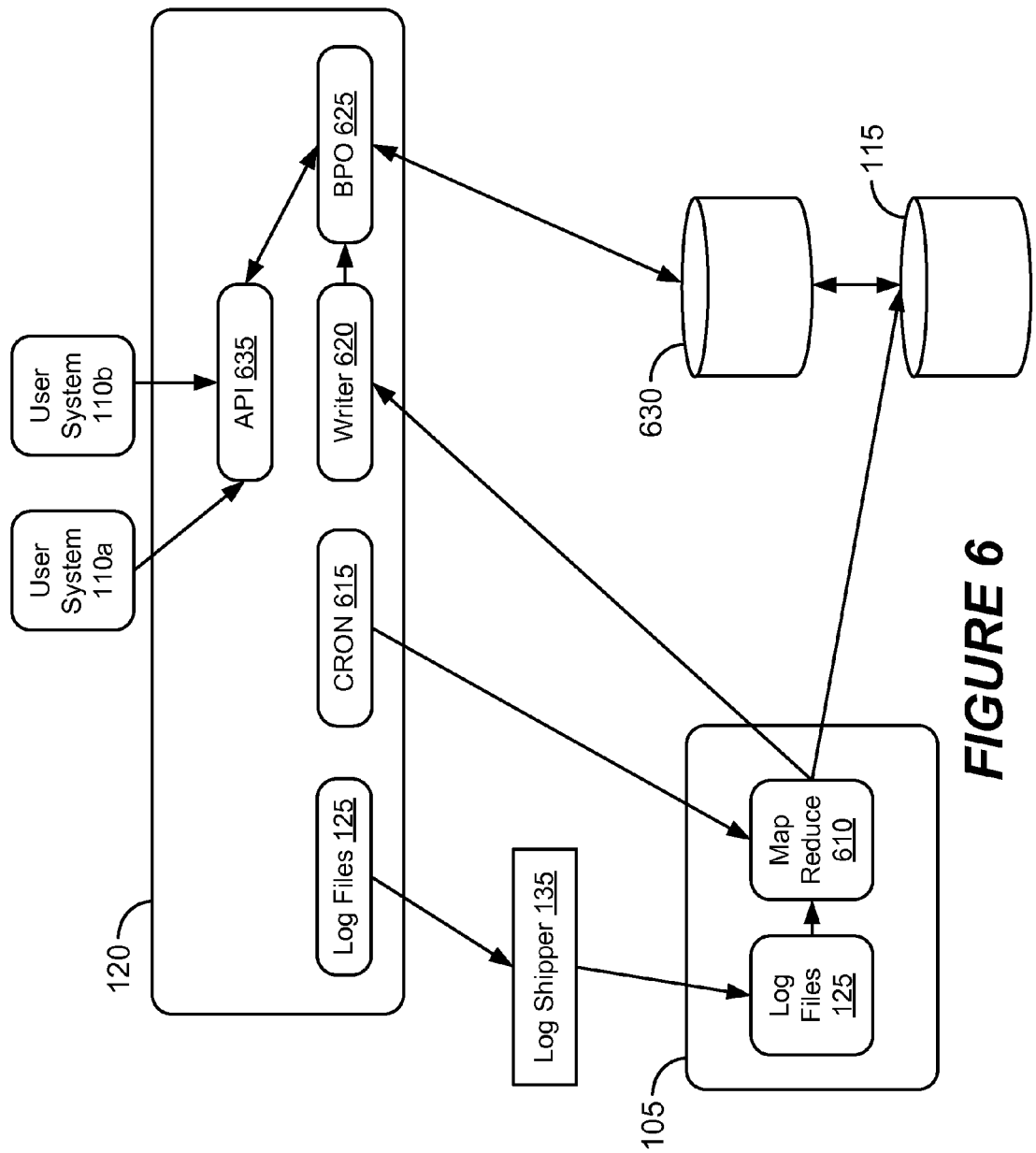
FIG. 6 shows an example of an operating environment according to some implementations.

In some implementations, block 342 of FIG. 3 may be initiated by CRON 615 of FIG. 6 at a time after log shipper 135 provides the log files to log processing server 105. For example, CRON 615 may be a time-based job scheduler set up to inform map reduce logic 610 when to begin. In some implementations, if log shipper 135 transfers logs from application server 120 to log processing server 105 at 2 A.M., then CRON 615 may inform map reduce logic 610 to begin at 3 A.M. (i.e., a time later than the time when log shipper 135 provides the log files to log processing server 105). In some implementations, the time CRON 615 may inform map reduce logic 610 to begin may be based on how many logs log shipper 135 needs to provide to log processing server 105. For example, a higher number of logs to be provided may have a later map reduce start time than a lower number of logs.

Returning to FIG. 3, at block 344, for each selected entry, the server of the database system selects a subset of the data items based on the approved data. For example, in FIG. 6, map reduce logic 610 may also reduce the number of data fields of the log entries that were selected at block 342. Similar to the system administrator designating approved log entries, particular data fields may also be approved, for example, in the same or another XML data file with designations or attributions of the approved data fields.

In some implementations, customer-facing log files may then be generated, as generally described at block 240 of FIG. 2. In particular, customer-facing log files corresponding to the tenants may be generated based on the selected log entries and data fields from blocks 342 and 344.

For example, in FIG. 5A, log files 515, 520, 525, and 530 may be customer-facing log files with data corresponding to the selected log entries and data fields. That is, each log file 515, 520, 525, and 530 may include a subset of the total data of log files 505 and 510. Log file 515 includes log entries A and C. Log file 520 includes log entries B and D. Log file 525 includes log entries E and F. Log file 520 includes entries G and H. The entries may be included in the log files 515, 520, 525, and 530 because the entries were selected. Four customer-facing log files (i.e., log files 515, 520, 525, and 530) may be created from the two log files 505 and 510 because each tenant may receive a log file without any entries associated with another tenant (e.g., a log entry generated based on an action by another tenant's client). For example, in FIG. 5A, log files 515 and 525 may include actions of one tenant's clients whereas log files 520 and 530 may include actions of another tenant's clients.

In FIG. 5A, each tenant may have two customer-facing log files generated because two log files 505 and 510 were parsed separately. However, in other implementations, the data in log files 515 and 525 may be provided in a single customer-facing log file. Likewise, the data in log files 520 and 530 may also be provided in a single customer-facing log file.

In FIG. 5A, log entry X from log file 510 is not provided in any of the customer facing log files 515, 520, 525, and 530 because, as previously discussed, log entry X may be associated with an event type that is not approved to be provided to the tenants, and therefore, would not be selected.

Additionally, in FIG. 5A, the log entries in log files 515, 520, 525, and 530 may also include fewer data fields than the corresponding entries in log files 505 and 510. In FIG. 5A, log entry D in log file 320 includes fewer data fields than log entry D in log entry 505. In particular, tenant ID and server load data fields are not provided in the customer-facing log file because they were not specified as being approved, as previously discussed. Likewise, log entry E in log file 525 also includes fewer data fields than log entry E in data file 510 for similar reasons.

In some implementations, activities of user systems 110a or 110b may generate multiple log entries associated with events. FIG. 5B shows an example of multiple log entries associated with events according to some implementations. In FIG. 5B, the shaded data is excluded from the customer-facing log files. The non-shaded data is included in the customer-facing log files.

In FIG. 5B, three different actions (i.e., logins, Indexing, and URI) may be performed by user system 110a, captured, and corresponding log entries may be generated. As previously discussed, some entries associated with certain event types (e.g., Indexing in FIG. 5B) may not be provided in the customer-facing log files, and therefore, is shaded in FIG. 5B. Log entries associated with Logins and URI may be in the customer-facing log files, and therefore, are not shaded. However, some types of events may generate multiple log entries. For example, in FIG. 3B, a URI event generates 3 log entries all of the same entry type (e.g., URI): Cascading Style Sheets (CSS) (e.g., for accessing a CSS file), JavaServer Pages (JSP) (e.g., for accessing a JSP file), and JavaScript (JS) (e.g., for accessing a JS file). These "sub-entries" may further be indicated by the system administrator as being approved (e.g., in the same XML file as previously discussed) to be in the customer-facing log files. In FIG. 5B, CSS and JS types of sub-entries of the URI entry type are excluded from the customer-facing log files. However, the JSP sub-entry type may be provided in the customer-facing log files. Certain data fields in FIG. 5B (e.g., server load) are excluded from the customer-facing log files because the data field is excluded, as previously discussed. Accordingly, a subset of entries (i.e., the sub-entries) of the event (e.g., URI) may be selected.

Returning to FIG. 3, at block 350, the server of the database system stores pointers identifying the customer-facing log files as at least one data object in a database. Each pointer stored by the database system may indicate a location of a corresponding customer-facing log file.

Additionally, returning to FIG. 6, map reduce logic 610 may provide data to writer 620 of application server 120 with details on the customer-facing log files. Writer 620 may provide the details to a base platform object (BPO) 625, which may create a data object by writing a row in database 630 with a pointer (e.g., a URL) to the appropriate log files stored in customer-facing log file system. For example, BPO 625 may write in database 630 a URL or data path for each of the customer-facing log files so that the tenant may later be able to access the customer-facing log files. Additionally, the tenant ID for each of the customer-facing log files may also be stored in the rows.

In some implementations, the customer entities may be capable of accessing the customer-facing log files using an API providing access to the pointers. For example, the tenant may access the customer-facing log files by using API 635. For example, the tenant may use the API 635 to contact BPO 625 to find the pointers for its customer-facing log files based on determining the pointers in a row with a corresponding tenant ID. The tenant may then be provided the customer-facing log files from customer-facing log files 115 based on using the pointers. As a result, BPO 625 allows a user to access, via the API, a database table with the pointers to the stored customer-facing log files. In some implementations, in addition to the pointers, users may also be provided attributes of the customer-facing log files such length (i.e., the file size), log date, and type of log.

In some implementations, the customer-facing log files generated by map reduce logic 610 may be comma separated value (CSV) files with each log entry on its own line (e.g., of a text file) with each data field separated by a comma. As a result, tenants may receive the CSV files with the log entries and data fields and use the data to develop their own applications. For example, tenants may be able to plot on a map the geographical locations where clients are downloading files from and determine whether data leakage problems exist, for example, by finding out that a file was downloaded from an unsecure location. Tenants may also use the customer-facing log files for compliance and auditing purposes. Additionally, comingled data may be split into tenant-specific data in tenant-specific customer-facing log files. As such, the customer-facing log files may be integrated into third-party applications developed by applications developed by the tenants.

In some implementations, only specific tenants may be provided with customer-facing log files. For example, tenants may pay to receive customer-facing log files, and therefore, the tenant ID data field in log entries may be analyzed to determine whether the tenant ID belongs to a tenant that pays for the service. Tenants who pay for the service may have their customer-facing log files stored in customer-facing log files 115 and access the logs through API 435. Clients who do not pay may not have any log files in customer-facing log files 115, or may not be able to access any sort of log file in customer-facing log files 115.

Figure 4:
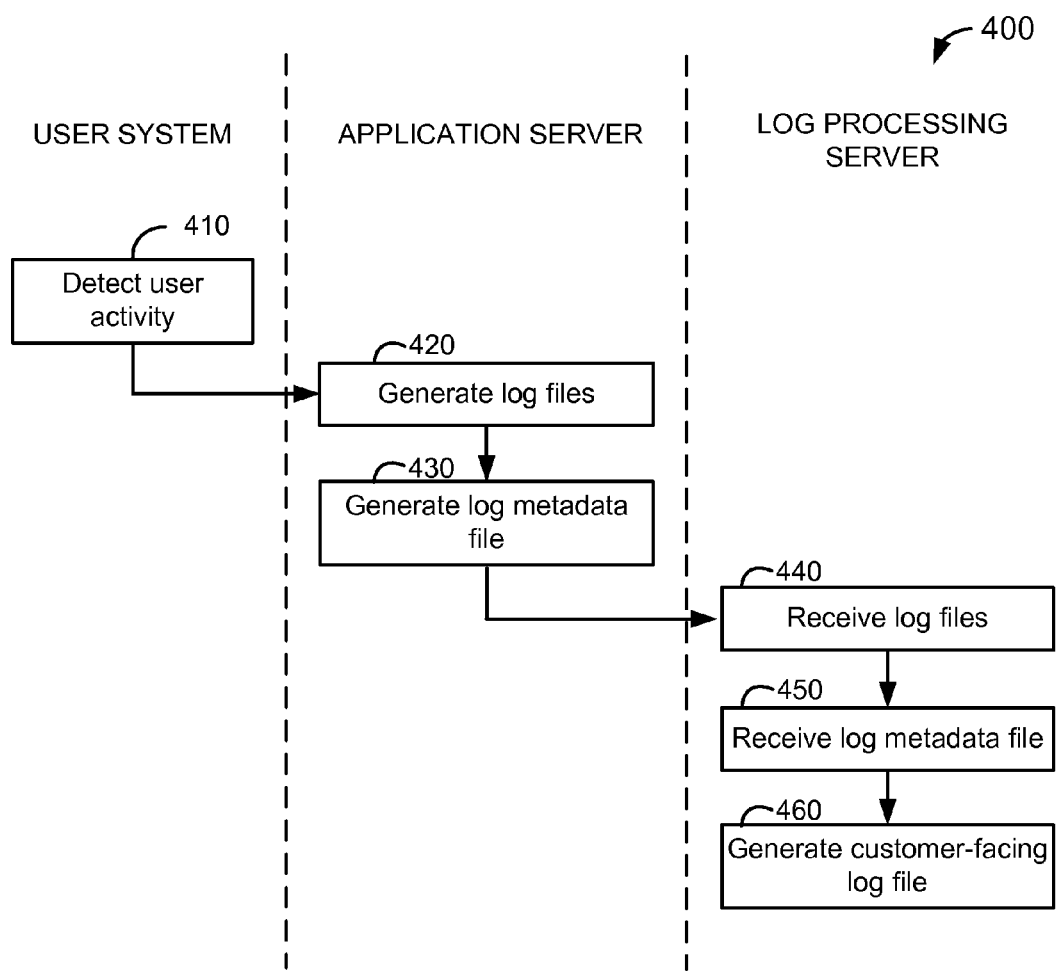
FIG. 4 shows a flowchart of an example of a method 400 for processing log files, according to some implementations.

FIG. 4 shows a flowchart of an example of a method 400 for processing log files, according to some implementations. In FIG. 4, at block 410, a user system 110a of FIG. 1 indicates user activity, which may include clicking on a user interface element in a user interface. In FIG. 4, at block 420, application server 120 of FIG. 1 generates log files based on the user activity communicated to the application server from user system 110a. These log files may be generated and updated to record user interactions with the application hosted by the application server, as generally described above.

In FIG. 4, at block 430, application server 120 generates a log metadata file. In some implementations, the log metadata file is generated based on a log entry definition file that is provided at the application server, as generally described above. In some implementations, the log entry definition file may be provided by the application server to the log processing server, and the log processing server may generate the log metadata file based on the log entry definition file.

In FIG. 4, at block 440, log processing server 105 receives the log files generated by the application server. In FIG. 4, at block 450, the log processing server receives a log metadata file. In some implementations, the log metadata file includes instructions to MapReduce a job running on a Hadoop system regarding which log entries and log entry fields to extract from the received log files.

In FIG. 4, at block 460, the log processing server generates, using the received log files and the received log metadata file, customer-facing log files and provides the customer-facing log files to one or more tenants of the database system, as generally described above.

Figure 7A:
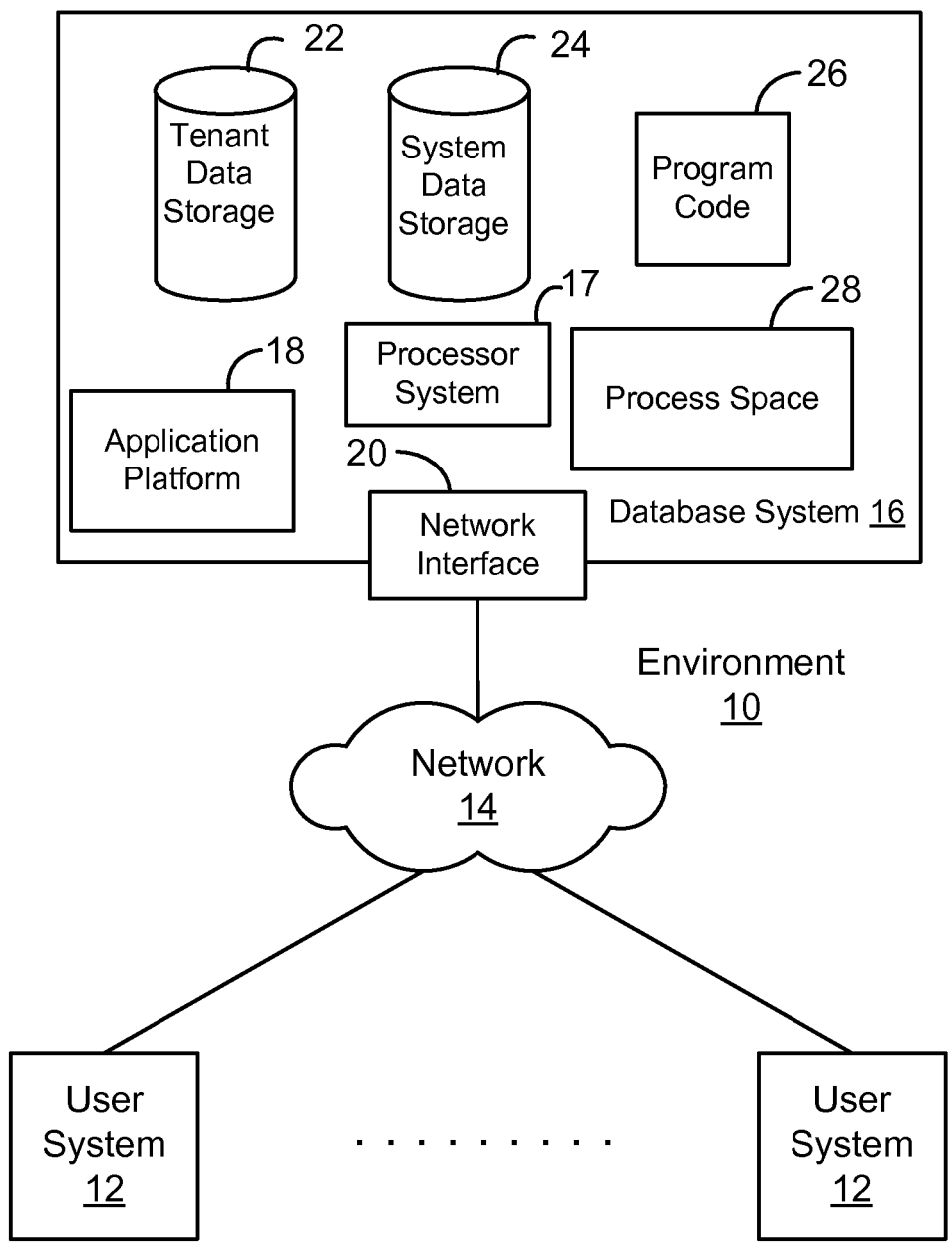
FIG. 7A shows a block diagram of an example of an environment 10 in which an on-demand database service can be used in accordance with some implementations.

FIG. 7A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
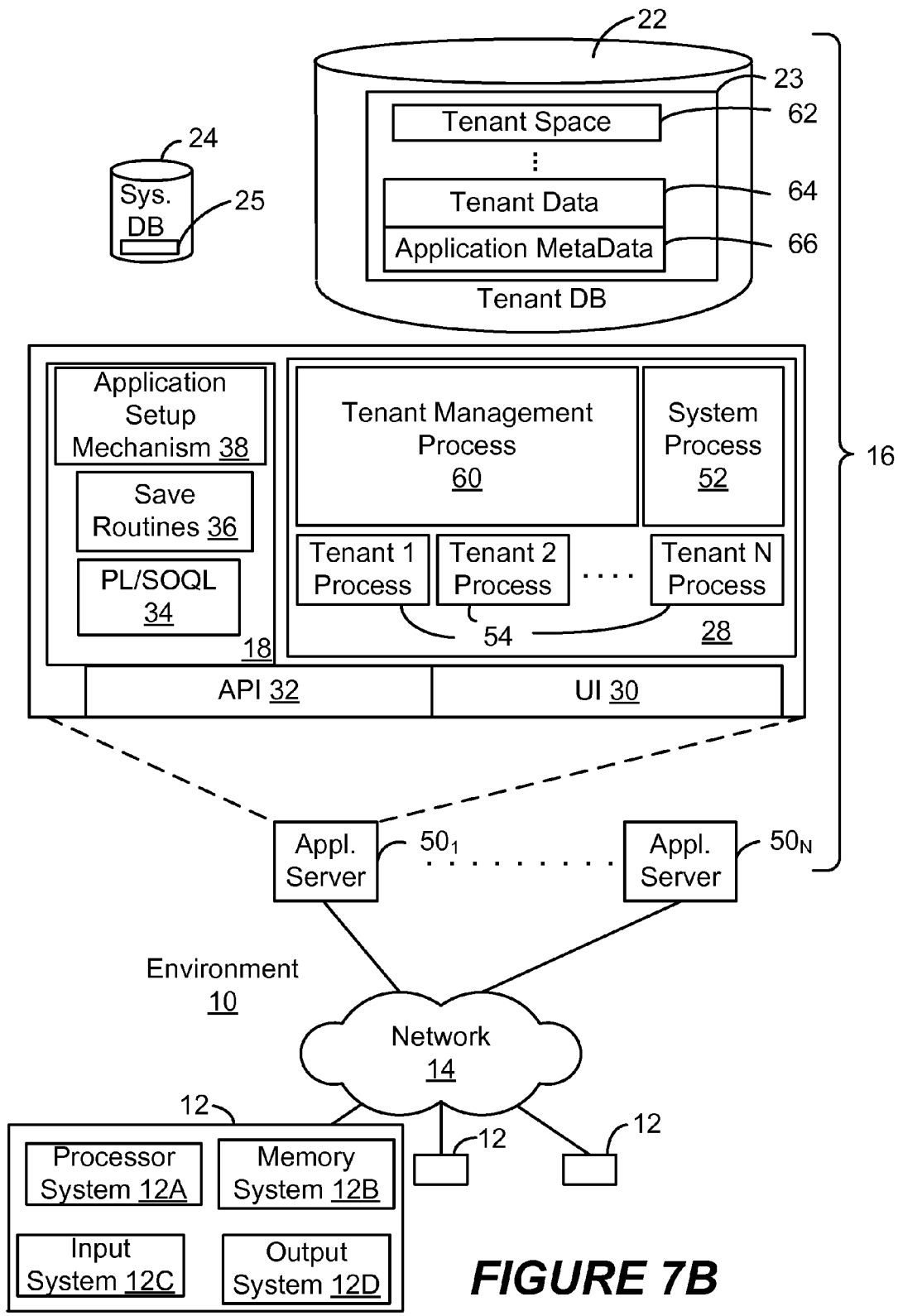
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
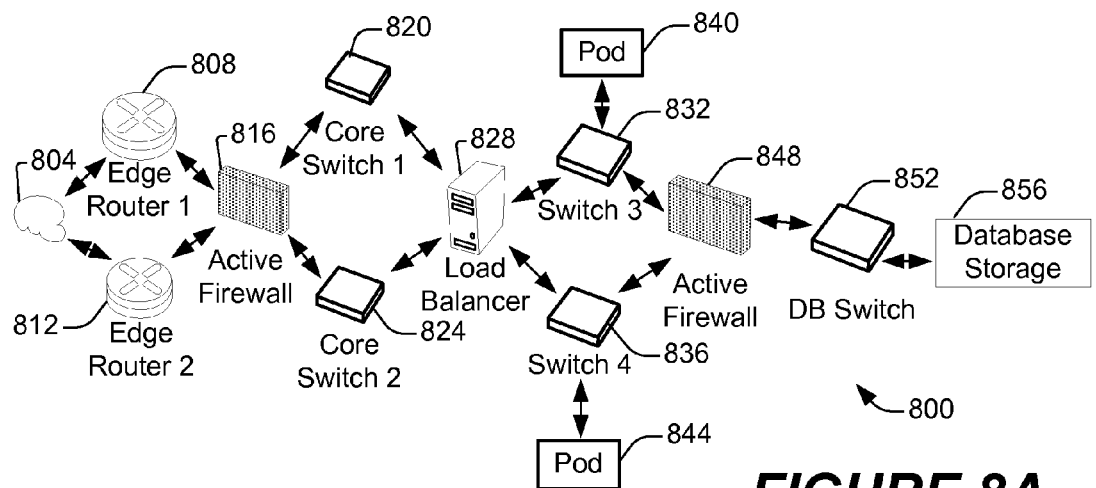
FIG. 8A shows a system diagram of an example of architectural components of an on-demand database service environment 800, in accordance with some implementations.

FIG. 8A shows a system diagram illustrating an example of architectural components of an on-demand database service environment 800 according to some implementations. A client machine located in the cloud 804, generally referring to one or more networks in combination, as described herein, may communicate with the on-demand database service environment via one or more edge routers 808 and 812. A client machine can be any of the examples of user systems 12 described above. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand database service environment may communicate with a database storage 856 via a database firewall 848 and a database switch 852.

Figure 8B:
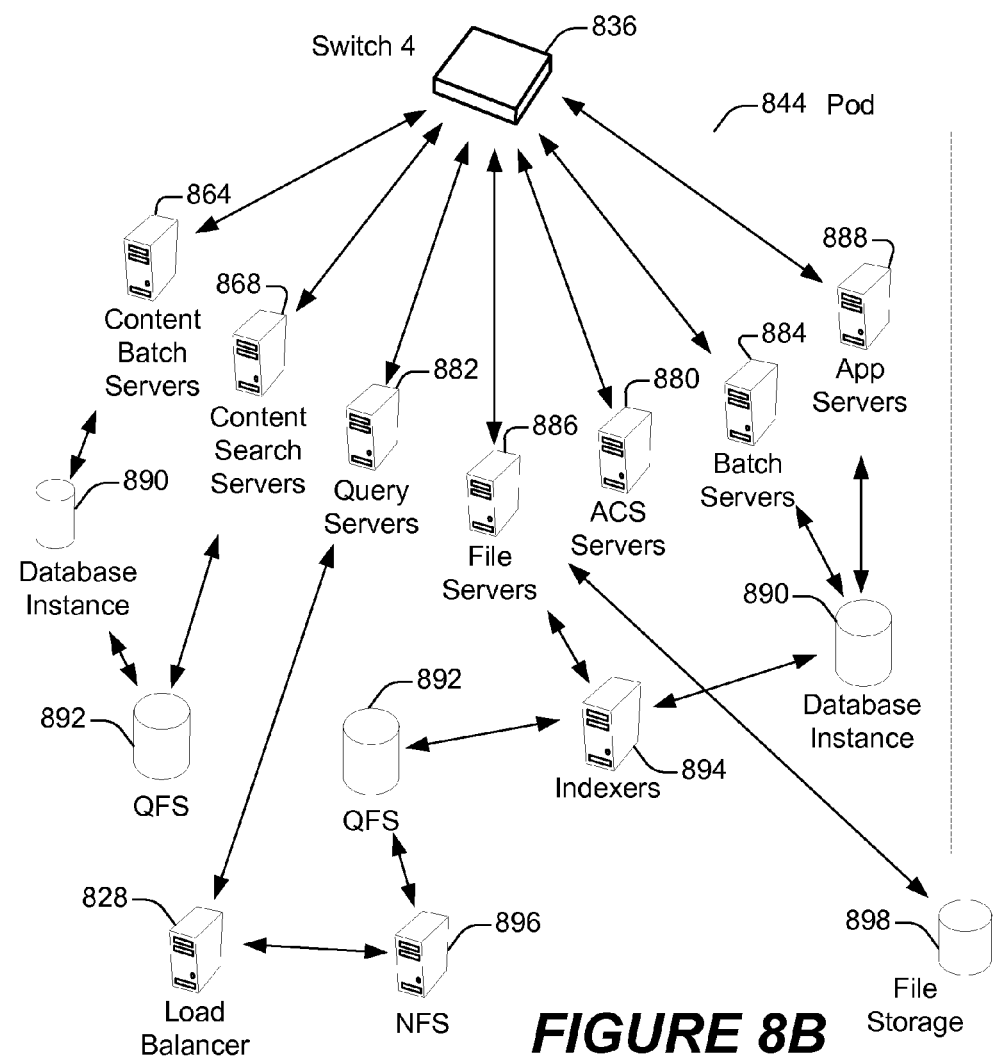
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 800 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand database service environment to access services provided by the on-demand database service environment. For example, client machines may access the on-demand database service environment to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The BGP is the core routing protocol of the Internet. The edge routers 808 and 812 may maintain a table of IP networks or 'prefixes', which designate network reachability among autonomous systems on the Internet.

In one or more implementations, the firewall 816 may protect the inner components of the on-demand database service environment 800 from Internet traffic. The firewall 816 may block, permit, or deny access to the inner components of the on-demand database service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 may be configured as network bridges that quickly route data between different components within the on-demand database service environment. In some implementations, the use of two or more core switches 820 and 824 may provide redundancy and/or reduced latency.

In some implementations, the pods 840 and 844 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage 856 may be conducted via the database switch 852. The multi-tenant database storage 856 may include more than one hardware and/or software components for handling database queries. Accordingly, the database switch 852 may direct database queries transmitted by other components of the on-demand database service environment (e.g., the pods 840 and 844) to the correct components within the database storage 856.

In some implementations, the database storage 856 is an on-demand database system shared by many different organizations. The on-demand database system may employ a multi-tenant approach, a virtualized approach, or any other type of database approach. An on-demand database system is discussed in greater detail with reference to FIGS. 7A and 7B.

FIG. 6B shows a system diagram further illustrating an example of architectural components of an on-demand database service environment according to some implementations. The pod 844 may be used to render services to a user of the on-demand database service environment 800. In some implementations, each pod may include a variety of servers and/or other systems. The pod 844 includes one or more content batch servers 864, content search servers 868, query servers 882, file servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the app servers 888 may include a hardware and/or software framework dedicated to the execution of procedures (e.g., programs, routines, scripts) for supporting the construction of applications provided by the on-demand database service environment 800 via the pod 844. In some implementations, the hardware and/or software framework of an app server 888 is configured to execute operations of the services described herein, including performance of the blocks of methods described with reference to FIGS. 1-4. In alternative implementations, two or more app servers 888 may be included and cooperate to perform such methods, or one or more other servers described herein can be configured to perform the disclosed methods.

The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand database service environment.

The file servers 886 may manage requests for information stored in the File storage 898. The File storage 898 may store information such as documents, images, and basic large objects (BLOBs). By managing requests for information using the file servers 886, the image footprint on the database may be reduced.

The query servers 882 may be used to retrieve information from one or more file systems. For example, the query system 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may call upon various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 828, which may distribute resource requests over various resources available in the on-demand database service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without using an additional database call.

In some implementations, database information may be transmitted to the indexer 894. Indexer 894 may provide an index of information available in the database 890 and/or QFS 892. The index information may be provided to file servers 886 and/or the QFS 892.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system comprising at least one processor, the database system configurable to cause:
   identifying a first one of a plurality of release versions of an application associated with a log file referenced by at least one data object in at least one database, the log file comprising a plurality of data entries identifying a plurality of system events, each data entry of the log file comprising a plurality of data items;
   generating or updating, based on at least the first release version of the application, a current metadata file different from at least one previous metadata file generated or updated based on at least another of the release versions of the application, the current metadata file capable of being referenced by at least one data object in the at least one database, the current metadata file indicating a plurality of approved entry types and approved data associated with each approved entry type, the current metadata file configured to control generating or updating of a customer-facing log file, according to the approved entry types and the approved data, to comprise a designated subset of the data entries and to comprise a designated subset of the data items of at least one of the data entries of the subset of data entries;

generating or updating, according to the current metadata file, a plurality of customer-facing log files capable of being referenced by at least one data object in the at least one database, each customer-facing log file associated with a corresponding customer organization of users capable of being serviced by the database system, each customer-facing log file comprising a respective designated subset of the data entries and comprising a respective designated subset of the data items of at least one of the data entries of the subset of data entries; and providing each customer-facing log file for access by devices of a corresponding customer organization of users.

2. The system of claim 1, wherein generating or updating the current metadata file comprises:

identifying a log entry definition file referenced by at least one data object in the at least one database, the log entry definition file being associated with the first release version of the application, the log entry definition file comprising descriptive data describing each data entry of the log file and comprising approval data identifying approved entry types and approved data; and generating or updating the current metadata file based on the descriptive data and the approval data of the log entry definition file.

3. The system of claim 2, wherein the current metadata file is an extensible markup language (XML) file, and the log entry definition file is an XML file.

4. The system of claim 1, wherein generating or updating a customer-facing log file comprises:

selecting the subset of data entries based on the approved entry types and based on the corresponding customer organization of users; and for each selected data entry, selecting the subset of the data items based on the approved data.

5. The system of claim 1, the database system further configurable to cause:

capturing a series of system events as the data entries of the log file.

6. The system of claim 1, wherein the system events are associated with an on-demand application hosted by the database system.

7. The system of claim 6, wherein the on-demand application is the first release version of the application.

8. The system of claim 1, wherein each customer-facing log file is associated with the first release version of the application.

9. The system of claim 1, the database system further configurable to cause:

storing pointers identifying the customer-facing log files as at least one data object in the at least one database, wherein each pointer indicates a storage location of a corresponding customer-facing log file.

10. The system of claim 9, wherein the customer organizations are capable of accessing the customer-facing log files using an application programming interface (API) providing access to the pointers.

11. A method comprising:

identifying, using a database system implemented using a server system comprising at least one processor, a first one of a plurality of release versions of an application associated with a log file referenced by at least one data object in at least one database, the log file comprising a plurality of data entries identifying a plurality of system events, each data entry of the log file comprising a plurality of data items;

generating or updating, using the database system and based on at least the first release version of the application, a current metadata file different from at least one previous metadata file generated or updated based on at least another of the release versions of the application, the current metadata file capable of being referenced by at least one data object in the at least one database, the current metadata file indicating a plurality of approved entry types and approved data associated with each approved entry type, the current metadata file configured to control generating or updating of a customer-facing log file, according to the approved entry types and the approved data, to comprise a designated subset of the data entries and to comprise a designated subset of the data items of at least one of the data entries of the subset of data entries;

generating or updating, using the database system and according to the current metadata file, a plurality of customer-facing log files capable of being referenced by at least one data object in the at least one database, each customer-facing log file associated with a corresponding customer organization of users capable of being serviced by the database system, each customer-facing log file comprising a respective designated subset of the data entries and comprising a respective designated subset of the data items of at least one of the data entries of the subset of data entries; and providing, using the database system, each customer-facing log file for access by devices of a corresponding customer organization of users.

12. The method of claim 11, wherein generating or updating the metadata file comprises:

identifying a log entry definition file referenced by at least one data object in the at least one database, the log entry definition file being associated with the first release version of the application, the log entry definition file comprising descriptive data describing each data entry of the log file and comprising approval data identifying approved entry types and approved data; and generating or updating the current metadata file based on the descriptive data and the approval data of the log entry definition file.

13. The method of claim 11, wherein generating or updating a customer-facing log file comprises:

selecting the subset of data entries based on the approved entry types and based on the corresponding customer organization of users; and for each selected data entry, selecting the subset of the data items based on the approved data.

14. The method of claim 11, the method further comprising:

capturing a series of system events as the data entries of the log file.

15. A system comprising:
database system software stored on a non-transitory data storage medium for execution by at least one processor of a database system, the database system software configurable to cause:
identifying a first one of a plurality of release versions of an application associated with a log file referenced by at least one data object in at least one database, the log file comprising a plurality of data entries identifying a plurality of system events, each data entry of the log file comprising a plurality of data items;
generating or updating, based on at least the first release version of the application, a current metadata file different from at least one previous metadata file generated or updated based on at least another of the release versions of the application, the current metadata file capable of being referenced by at least one data object in the at least one database, the current metadata file indicating a plurality of approved entry types and approved data associated with each approved entry type, the current metadata file configured to control generating or updating of a customer-facing log file, according to the approved entry types and the approved data, to comprise a designated subset of the data entries and to comprise a designated subset of the data items of at least one of the data entries of the subset of data entries;
generating or updating, according to the current metadata file, a plurality of customer-facing log files capable of being referenced by at least one data object in the at least one database, each customer-facing log file associated with a corresponding customer organization of users capable of being serviced by the database system, each customer-facing log file comprising a respective designated subset of the data entries and comprising a respective designated subset of the data items of at least one of the data entries of the subset of data entries; and
providing each customer-facing log file for access by devices of a corresponding customer organization of users.

16. The system of claim 15, wherein generating or updating the metadata file comprises:
identifying a log entry definition file referenced by at least one data object in the at least one database, the log entry definition file being associated with the first release version of the application, the log entry definition file comprising descriptive data describing each data entry of the log file and comprising approval data identifying approved entry types and approved data; and
generating or updating the current metadata file based on the descriptive data and the approval data of the log entry definition file.

17. The system of claim 15, wherein generating or updating a customer-facing log file comprises:
selecting the subset of data entries based on the approved entry types and based on the corresponding customer organization of users; and
for each selected data entry, selecting the subset of the data items based on the approved data.

18. The system of claim 15, the database system software further configurable to cause:
capturing a series of system events as the data entries of the log file.

19. A computer program product comprising program code to be executed by at least one processor when retrieved from a non-transitory computer-readable medium, the program code configured to cause:
identifying a first one of a plurality of release versions of an application associated with a log file referenced by at least one data object in at least one database, the log file comprising a plurality of data entries identifying a plurality of system events, each data entry of the log file comprising a plurality of data items;
generating or updating, based on at least the first release version of the application, a current metadata file different from at least one previous metadata file generated or updated based on at least another of the release versions of the application, the current metadata file capable of being referenced by at least one data object in the at least one database, the current metadata file indicating a plurality of approved entry types and approved data associated with each approved entry type, the current metadata file configured to control generating or updating of a customer-facing log file, according to the approved entry types and the approved data, to comprise a designated subset of the data entries and to comprise a designated subset of the data items of at least one of the data entries of the subset of data entries;
generating or updating, according to the current metadata file, a plurality of customer-facing log files capable of being referenced by at least one data object in the at least one database, each customer-facing log file associated with a corresponding customer organization of users capable of being serviced by a database system, each customer-facing log file comprising a respective designated subset of the data entries and comprising a respective designated subset of the data items of at least one of the data entries of the subset of data entries; and
providing each customer-facing log file for access by devices of a corresponding customer organization of users.

20. The computer program product of claim 19, wherein generating or updating the metadata file comprises:
identifying a log entry definition file referenced by at least one data object in the at least one database, the log entry definition file being associated with the first release version of the application, the log entry definition file comprising descriptive data describing each data entry of the log file and comprising approval data identifying approved entry types and approved data; and
generating or updating the current metadata file based on the descriptive data and the approval data of the log entry definition file.

* * * * *